United States Patent
Costa et al.

(10) Patent No.: US 10,645,619 B1
(45) Date of Patent: May 5, 2020

(54) TARGET INITIATED S1 HANDOVER OF USER EQUIPMENT

(71) Applicant: Sprint Spectrum L.P., Overland Park, KS (US)

(72) Inventors: Julio Costa, Tampa, FL (US); Muralidhar Malreddy, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 99 days.

(21) Appl. No.: 15/943,917

(22) Filed: Apr. 3, 2018

(51) Int. Cl.
*H04W 36/00* (2009.01)
*H04W 36/18* (2009.01)
*H04W 36/08* (2009.01)
*H04W 76/27* (2018.01)

(52) U.S. Cl.
CPC ... *H04W 36/0072* (2013.01); *H04W 36/0061* (2013.01); *H04W 36/18* (2013.01); *H04W 36/08* (2013.01); *H04W 76/27* (2018.02)

(58) Field of Classification Search
None
See application file for complete search history.

(56) References Cited

U.S. PATENT DOCUMENTS

2018/0176834 A1* 6/2018 Wei ............... H04W 36/0066

OTHER PUBLICATIONS

"LTE S1 Handover," https://www.eventhelix.com/lte/handover/s1/lte-s1-handover-no-mme-sgw-change.pdf (Feb. 2014).

* cited by examiner

*Primary Examiner* — Ayaz R Sheikh
*Assistant Examiner* — Sori A Aga (57) ABSTRACT

A mechanism for S1 handover triggered by a target eNodeB. When a UE is being served by a source eNodeB and detects threshold strong coverage of a target cell, the UE sends an RRC connection request to the target eNodeB and informs the target eNodeB that the UE is being served by the source eNodeB. In response, the target eNodeB engages in a process to invoke handover of the UE to the target eNodeB, without the target eNodeB having received from the MME or from the source eNodeB a handover request for the handover of the UE.

18 Claims, 3 Drawing Sheets

---

WHILE A UE IS BEING SERVED BY A SOURCE eNODEB AND THE UE HAS A FIRST RRC CONNECTION WITH THE SOURCE eNODEB AND HAS ONE OR MORE BEARERS EACH EXTENDING VIA THE SOURCE eNODEB, A TARGET eNODEB RECEIVES VIA THE WIRELESS COMMUNICATION INTERFACE FROM THE UE AN RRC CONNECTION REQUEST WITHOUT THE TARGET eNODEB HAVING RECEIVED FROM THE MME OR THE SOURCE eNODEB A HANDOVER REQUEST FOR THE HANDOVER OF THE UE — 44

↓

IN RESPONSE TO AT LEAST RECEIVING THE RRC CONNECTION REQUEST, THE TARGET eNODEB (I) GRANTS THE RRC CONNECTION REQUEST SO AS TO ESTABLISH FOR THE UE A SECOND RRC CONNECTION WITH THE SECOND eNODEB WHILE THE UE MAINTAINS THE FIRST RRC CONNECTION WITH THE SOURCE eNODEB, AND (II) SIGNALS TO THE MME VIA THE BACKHAUL COMMUNICATION INTERFACE TO REQUEST HANDOVER OF THE UE FROM THE SOURCE eNODEB TO THE TARGET eNODEB — 46

Fig. 1

(EXAMPLE TYPICAL WIRELESS COMMUNICATION SYSTEM)

TARGET INITIATED S1 HANDOVER OF USER EQUIPMENT

BACKGROUND

A typical wireless communication system operating according to the Evolved Universal Terrestrial Radio Access (E-UTRA) standards includes a plurality of base stations referred to as evolved Node B's (eNodeBs), each providing radio frequency (RF) coverage defining a cell in which to serve user equipment devices (UEs) such as cell phones, tablet computers, tracking devices, embedded wireless modules, and other wirelessly equipped communication devices, whether or not technically user operated. The eNodeBs further sit as nodes on a core packet-switched network, though which the eNodeBs interface with a network controller referred to as a mobility management entity (MME) and with a system of gateways, including serving gateways (SGWs) and packet-data network gateways (PGWs) that provide connectivity with one or more transport networks such as the public Internet for instance.

Each cell in such a system typically operates on a carrier frequency and defines various air interface channels for carrying information between the eNodeB and UEs.

On the downlink, for instance, each cell may define synchronization channels for carrying signals that UEs can detect as an indication of coverage and that indicate a physical cell identifier (PCI) of the cell. Further, each cell may define a cell-specific reference channel for carrying a reference signal that UEs can measure to evaluate coverage strength, a downlink control channel for carrying system information, page messages, and other control signaling from the eNodeBs to UEs, and a shared traffic channel on which the eNodeB can allocate resources for carrying bearer traffic from the eNodeB to UEs.

And on the uplink, each cell may define an access channel for carrying random access signaling from UEs, an uplink control channel for carrying service requests, measurement reports, and other control signaling from UEs, and an uplink shared traffic channel on which the eNodeB may allocate resources as needed to carry bearer traffic from UEs.

When a UE initially enters into coverage of such a system (e.g., powers on in coverage of the system), the UE may scan the airwaves in search of a cell providing a sufficiently strong reference signal, and the UE may then work to connect with the eNodeB providing that signal and to register for service with the network. For instance, the UE may engage in random access signaling with the eNodeB and then transmit to the eNodeB a Radio Resource Configuration (RRC) request message, and the eNodeB may grant the request, establishing an RRC connection defining a radio-link-layer connection between the UE and the eNodeB. Here, the eNodeB may assign to the UE an RRC connection identifier (C-RNTI) and establish a UE context record noting the existence of the RRC connection. Further, the UE may transmit an attach request to the eNodeB, which the eNodeB may forward to the MME over an S1-MME interface, to register the UE for service with the network.

Upon receipt of the UE's attach request, the MME may engage in a process to authenticate the UE. And the MME may then coordinate establishment for the UE of one or more bearers defining logical channels through the core network for carrying bearer traffic to and from the UE via the eNodeB. In particular, the MME may engage in signaling with the eNodeB and with a serving gateway (SGW) to establish for the UE an S1-U tunnel between eNodeB and SGW, the SGW may responsively engage in signaling with a packet-data network gateway (PGW) to establish an S5 tunnel between the SGW and the PGW and may bridge the S5 tunnel with the S1 tunnel, and the PGW may assign an Internet Protocol (IP) address useable by the UE to engage in packet-data communication.

Once the UE is thus RRC connected with the eNodeB and has one or more such bearers extending via the eNodeB, the eNodeB may then serve the UE with wireless data communications.

For instance, when the UE has packet-data to transmit, the UE could transmit a scheduling request to the eNodeB, the eNodeB could allocate uplink shared channel resources for use by the UE, and the UE could transmit the data on those resources. Upon receipt of the data, the eNodeB could then forward the data via one of the UE's one or more bearers to the SGW, the SGW could forward the data over the bearer to the PGW, and the PGW could output the data for transmission to its destination. Likewise, when data arrives at the PGW for transmission to the UE, the data could flow over one of the UE's one or more bearers via the SGW to the eNodeB, the eNodeB could allocate downlink shared channel resources for the transmission, and the eNodeB could transmit the data on the allocated resources to the UE.

In addition, while the UE is RRC connected, the UE may also work to ensure that the UE continues to be served by a sufficiently strong coverage area, and perhaps by the strongest available coverage area.

To facilitate this, the UE may continue to regularly monitor reference signal strength from its serving eNodeB and, perhaps upon detecting that its serving eNodeB's reference signal strength becomes threshold low, may scan the airwaves in search of another cell with threshold strong coverage. Upon detecting such another cell, the UE may then transmit to its serving eNodeB a measurement report that specifies the PCI and signal strength of the detected cell. And in response to the measurement report, the eNodeB may then engage in a process to trigger handover of the UE from being served by the eNodeB to being served instead by the eNodeB that provides the reported cell.

OVERVIEW

Handover of an RRC-connected UE from a source eNodeB (e.g., the UE's currently serving eNodeB) to a target eNodeB (e.g., an eNodeB that provides a sufficiently strong cell detected and reported by the UE) can generally be X2-based or S1-based.

With X2-based handover, the eNodeBs engage in direct signaling with each other over an X2 interface (inter-eNodeB interface) through the core network. When the source eNodeB receives the UE's measurement report identifying the detected cell of the target eNodeB, the source eNodeB transmits to an IP address of the target eNodeB an X2AP handover request message, identifying the UE and providing information about the UE's established bearer(s). The target eNodeB then responds to the source eNodeB with an X2AP handover request acknowledge message, providing tunnel information for carrying data directly between the eNodeBs during the handover, and providing a handover command message (HCM) (e.g., RRC connection reconfiguration request message) that the source eNodeB transparently forwards to the UE. Further, the target eNodeB may allocate radio resources for the UE, establish a UE context record, and provide in the HCM a C-RNTI for an RRC connection, and the target eNodeB may provide a contention-free random access preamble that the UE can use to facilitate readily connecting with the target eNodeB.

As the UE then responsively connects with the target eNodeB, the target eNodeB in this X2-based handover process further sends path-switch request to the MME, the MME then engages in signaling to transfer the UE's one or more S1-U tunnels from the source eNodeB to the target eNodeB. And the target eNodeB then signals to the source eNodeB to cause the source eNodeB to release UE context, largely completing the handover.

With S1-based handover, on the other hand, the eNodeBs engage in signaling with and through the MME (perhaps one or more MMEs) to effect the handover. S1 handover may be used when X2 handover is unavailable, such as where there is no established X2 interface between the source and target eNodeBs. By way of example, S1 handover may be used where one of the eNodeBs is a macro eNodeB and where the other eNodeB is a small-cell eNodeB.

In S1-based handover, the source eNodeB sends an S1AP handover required message to the MME, providing information about which one or more bearer tunnels are available for data forwarding via the SGW (since the X2 interface is not available). The MME then sends a handover request message to the target eNodeB, providing S1 bearer tunnel information to facilitate tunneling between the SGW and the target eNodeB. In response to this handover request message from the MME, the target eNodeB may then allocate radio resources allocate radio resources for the UE, establish a UE context record, and assign a C-RNTI for an RRC connection. And the target eNodeB may respond to the MME with an S1AP handover request acknowledgement, which provides an HCM (e.g., RRC connection reconfiguration request message) and bearer tunnel information.

The MME then engages in signaling with the SGW to cause the SGW to establish an indirect tunnel for data forwarding during the handover, so that downlink data arriving at the source eNodeB can be forwarded to the SGW and from the SGW to the target eNodeB for ultimate transmission to the UE. Further, the MME forwards the HCM to the source eNodeB, and the source eNodeB forwards the HCM to the UE. The UE then responsively connects with the target eNodeB and sends to the target eNodeB an RRC connection reconfiguration complete message, largely completing the handover process.

To facilitate either of these handover processes, the source eNodeB may maintain neighbor list data that lists various neighboring cells, specifying for each neighboring cell the cell's PCI, a globally unique identifier such as enhanced cell global identity (ECGI), and perhaps an IP address of the associated eNodeB. When the UE provides a measurement report specifying the PCI of a detected target cell, the source eNodeB could then refer to its neighbor list data to identify information about the reported target cell, to facilitate handover of the UE to that cell. If X2-based handover will be used, for instance, the source eNodeB might determine the target eNodeB's IP address so as to engage in X2AP signaling with the target eNodeB. Whereas, if S1-based handover will be used, the source eNodeB might determine the target cell's ECGI and provide the ECGI among other information in its S1AP signaling to the MME, so that the MME can engage in signaling with the proper target eNodeB.

Unfortunately, however, there could be situations where the neighbor list data maintained by the source eNodeB does list a reported target cell. This may happen, for instance, in a market where many small-cell eNodeBs are deployed to help fill in macro network coverage gaps or the like. In such an arrangement, neighbor list data maintained by macro eNodeBs might not list all of the neighboring small-cell coverage, and neighbor list data maintained by various small-cell eNodeBs may not list all other neighboring small-cell coverage.

When a source eNodeB receives a UE's measurement report specifying a threshold strong detected target cell by PCI, if the source eNodeB determines that the PCI is not listed in the source eNodeB's neighbor list data, the source eNodeB could responsively ask the UE to get and report further identifying information about the detected target cell. For instance, the source eNodeB could responsively transmit to the UE a signaling message (directive) that requests such additional information. And the UE could then responsively read system information broadcast by the target cell or otherwise interact with the target eNodeB to determine the ECGI and/or other such information about the target cell. Once the UE thereby obtains the necessary information, the UE could then responsively provide the information to the source eNodeB. And the source eNodeB could proceed to invoke handover of the UE to the detected target cell.

A problem with this gathering of additional information about the target cell, however, is that it can take time and can delay the overall handover process. Therefore, an alternative is desired.

Disclosed herein is a mechanism for S1 handover triggered by a target eNodeB. Per the disclosure, when a UE is being served by a source eNodeB and detects threshold strong coverage of a target cell, the UE may send an RRC connection request to the target eNodeB and may inform the target eNodeB that the UE is being served by the source eNodeB. In response, the target eNodeB may then engage in a process to invoke handover of the UE to the target eNodeB, without the target eNodeB having received from the MME or from the source eNodeB a handover request for the handover of the UE. In effect through this process, the handover becomes more of a pull operation from the target eNodeB and less of a push operation from the source eNodeB.

Accordingly, one respect, disclosed is method for handover of a UE from a first eNodeB to a second eNodeB, where each eNodeB has a respective communication interface with an MME and each eNodeB provides a respective wireless coverage area in which to serve UEs. The method includes, while the UE has a first RRC connection with the first eNodeB and has one or more bearers each extending via the first eNodeB, the second eNodeB receiving from the UE an RRC connection request without the second eNodeB having received from the MME or the first eNodeB a handover request for the handover of the UE. And the method then includes, in response to at least the RRC connection request, the second eNodeB (i) granting the RRC connection request so as to establish for the UE a second RRC connection with the second eNodeB while the UE maintains the first RRC connection with the first eNodeB, and (ii) signaling to the MME to request handover of the UE from the first eNodeB to the second eNodeB, wherein the signaling to the MME causes the MME to process handover of the UE from being served by the first eNodeB to being served by the second eNodeB.

In another respect, disclosed is an wireless communication system including first and second eNodeBs, where each eNodeB has a respective signaling interface with an MME and each eNodeB provides a respective wireless coverage area. In such a system, the second eNodeB includes a wireless communication interface, including an antenna structure, through which to engage in air interface communication with UEs, a backhaul communication interface through which to communicate with the MME and with a gateway system that provides connectivity with a packet-switched transport network, a processing unit, non-transitory data storage, and program instructions stored in the non-transitory data storage and executable by the processing unit to carry out operations to facilitate handover of UE from being served by the first eNodeB to being served by the second eNodeB.

The operations here could be like those noted above. For instance, the operations could include, while the UE is being served by the first eNodeB and the UE has a first RRC connection with the first eNodeB and has one or more bearers each extending via the first eNodeB, receiving via the wireless communication interface from the UE an RRC connection request without the second eNodeB having received from the MME or the first eNodeB a handover request for the handover of the UE. And the operations could further include, in response to at least the RRC connection request, (i) granting the RRC connection request so as to establish for the UE a second RRC connection with the second eNodeB while the UE maintains the first RRC connection with the first eNodeB, and (ii) signaling to the MME via the backhaul communication interface to request handover of the UE from the first eNodeB to the second eNodeB, wherein the signaling to the MME causes the MME to process handover of the UE from being served by the first eNodeB to being served by the second eNodeB.

Still further, disclosed is method of processing handover of a UE from being served by a first eNodeB to being served by a second eNodeB, where each eNodeB has a respective signaling interface with an MME and each eNodeB provides a respective wireless coverage area. The method includes, while the UE is served by the first eNodeB and the UE has a first Radio RRC connection with the first eNodeB and has one or more bearers via the first eNodeB, the UE transmitting to the second eNodeB an RRC connection request without the second eNodeB having received a handover request for the handover of the UE from being served by the first eNodeB to being served by the second eNodeB. Further, in this method, the UE provides to the second eNodeB, within or separately from the RRC connection request, an indication that the UE is currently served by the first eNodeB, wherein the indication causes the second eNodeB to initiate signaling with the MME to request handover of the UE from being served by the first eNodeB to being served by the second eNodeB.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication system in which features of the present disclosure can be implemented. It should be understood that this and other arrangements and processes described herein are set forth for purposes of example only, and that other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processing units programmed to execute computer instructions for instance.

Figure 1:
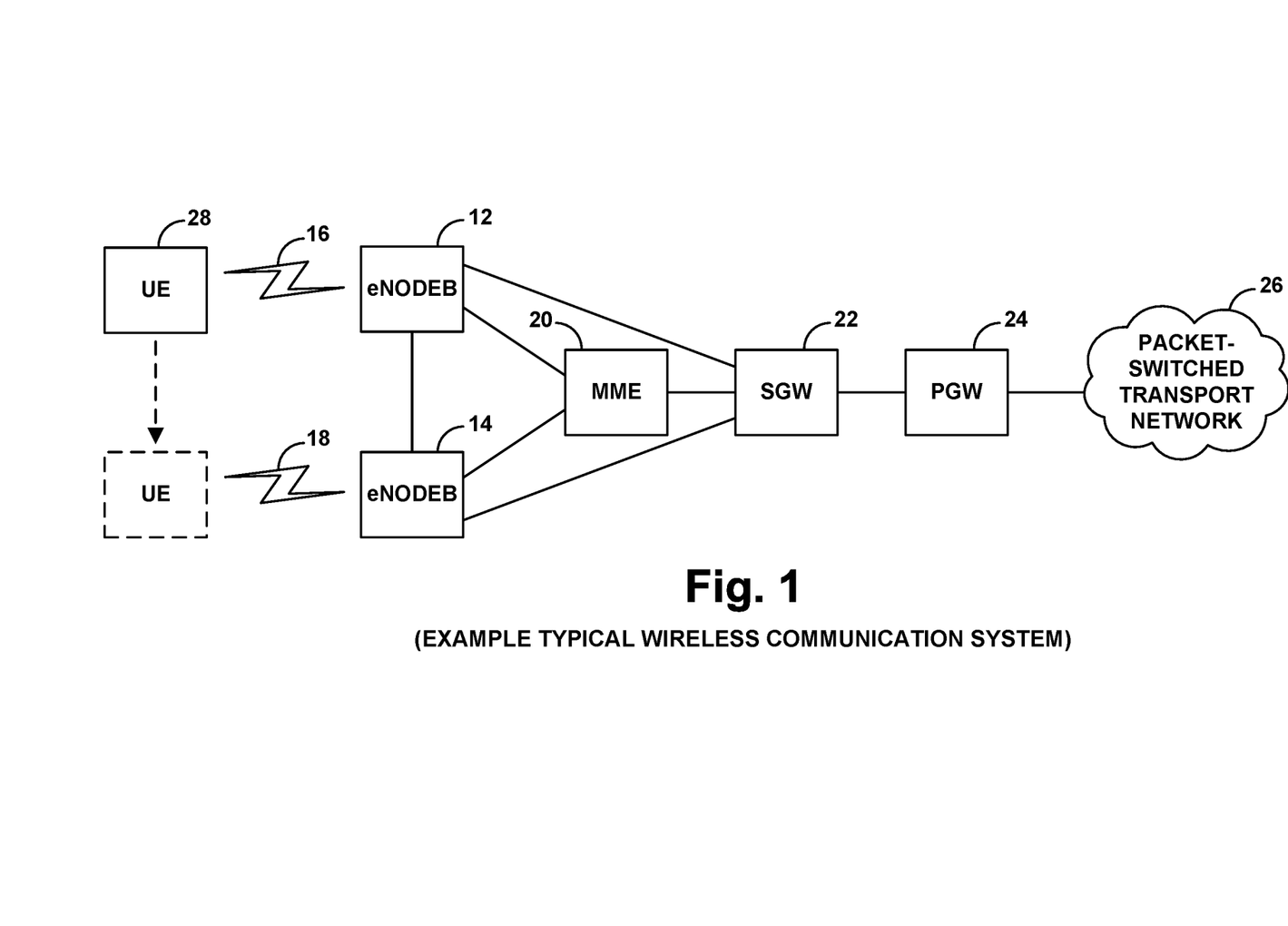
FIG. 1 is a simplified block diagram of an example wireless communication system in which aspects of the present disclosure can be implemented.

The system of FIG. 1 includes two representative eNodeBs 12, 14, each providing a respective cell 16, 18. These eNodeBs could take various forms and could differ in form from each other. By way of example, either eNodeB could be a macro eNodeB, a small-cell eNodeB, a relay eNodeB, or another type of eNodeB. In a representative implementation, for instance, eNodeB 12 could be a macro eNodeB, and eNodeB 14 could be a small-cell eNodeB provided to help fill in a coverage gap within coverage of eNodeB 12. Each eNodeB includes an antenna structure and associated equipment (e.g., filters, amplifiers, baseband processors, etc.) to facilitate various eNodeB operations.

The two eNodeBs are then shown having interfaces with an MME 20 (which could be a single MME or could include separate MMES, one associated with each eNodeB) and with an SGW 22, and the SGW 22 is in turn shown having an interface with the MME 20 and with a PGW 24 that provides connectivity with a packet-switched transport network 26. As noted above, these various entities could sit as nodes on a core packet-switched network. Therefore, the illustrated interfaces could take the form of logical connections through which pairs of nodes are configured to communicate with each other.

Shown within coverage of eNodeB 12 is then a representative UE 28. This UE could take various forms, such as any of the examples noted above for instance. The UE would include an antenna structure and associated components (e.g., filters, amplifiers, and baseband processors, etc.) to facilitate various UE operations.

With this arrangement, we can assume that UE 28 is served by eNodeB 12 in cell 16. By way of example, UE 28 may have initially powered on within cell 16 and, upon scanning for coverage, may have found strongest coverage of cell 16. UE 28 may therefore have engaged in random access signaling with eNodeB 12 and then sent an RRC connection request to eNodeB 12, in order to establish an RRC connection with eNodeB 12. And UE 28 may have then engaged in attach signaling with the MME.

In the attach process, the MME may have assigned and provided to the UE a temporary identifier such as a temporary mobile subscriber identity (TMSI) useable for identifying the UE securely within the network, and the MME may have made a record of that assignment. Further, the MME may have coordinated establishing for the UE of, say, two bearers each extending between the UE 28 and PGW 24, including (i) a radio-bearer portion between the UE and the eNodeB 12, (ii) an S1-U tunnel between the eNodeB 12 and the SGW 22, and (iii) an S5 tunnel between the SGW 22 and the PGW 24. By way of example, one such bearer may be a general purpose (best efforts) Internet bearer for carrying general data communication, and the other bearer may be an Internet Multimedia Subsystem (IMS) signaling bearer for carrying signaling for use to set up and manage Voice-Over-IP and other such real-time media communications. Other examples are possible as well.

In line with the discussion above, as the UE is served by eNodeB 12 in an RRC connected mode, the UE may also regularly monitor coverage strength to help ensure that it is served by the strongest available coverage area. Through this process, the UE might detect that coverage of cell 16 reaches a threshold low level and may therefore begin scanning for other coverage. And as a result, the UE may then discover that coverage of cell 18 is threshold strong and/or threshold stronger than the coverage of cell 16, justifying a possible handover. This may happen, for instance, as the UE moves out of coverage of eNodeB 12 and into coverage of eNodeB 14 as shown. Note that the UE could also decide for one or more other reasons that handover from eNodeB 12 to eNodeB 14 would be desirable.

In accordance with the present disclosure, for the UE to hand over from eNodeB 12 to eNodeB 14 while the UE is in an RRC connected mode with eNodeB 12 (and is not currently being served by eNodeB 14), the UE will proceed directly to connect with eNodeB 14 and will trigger a process to transition the network from serving the UE via eNodeB 12 to instead serving the UE via eNodeB 14.

In an example implementation, for instance, the UE may determine the PCI of cell 18 (e.g., as indicated by a synchronization signal broadcast by eNodeB 14) and transmit to eNodeB 12 a measurement report that indicates the detected coverage strength and the associated target PCI. When eNodeB 12 refers to its neighbor list data, however, eNodeB 12 may discover that its neighbor list data does not include a reference for the indicated target PCI. Alternatively, eNodeB 12 may not have neighbor list data, or eNodeB 12 may have neighbor list data that includes more than one listing for the target PCI. In any case, eNodeB 12 may thus not have a good basis to know which target cell the UE is reporting.

To facilitate handover of the UE to the reported target cell, eNodeB 12 could thus transmit to the UE, in response to the measurement report, a request for the UE to obtain the target cell's ECGI. But in response to having received the request from eNodeB 12 to obtain the ECGI of the detected target cell 18, the UE could then proceed directly to connect with target eNodeB 14 rather than going through the process to obtain and report the requested ECGI.

In another example implementation, the UE could more autonomously proceed to connect with target eNodeB 14 possibly without even providing to eNodeB 12 a measurement report for cell 18. For instance, once the UE detects the threshold strong enough coverage of cell 18 while the UE is currently RRC-connected with eNodeB 12, the UE could proceed directly to connect with eNodeB 14. Note that this happens in the RRC connected mode, which is technologically different than the UE being in an RRC idle mode.

To connect with eNodeB 14 in these or other examples, while the UE is RRC connected with eNodeB 12, the UE may engage in random access signaling with eNodeB 14 and may the transmit to eNodeB 14 an RRC connection request, requesting to establish a new RRC connection with eNodeB 14. The UE could do this during a regularly scheduled tune-away time from eNodeB 12 or at another time. And here, the UE could include in its RRC connection request or with associated signaling an indication (e.g., one or more values) interpretable by eNodeB 14 as an indication that the UE's RRC connection request is a special form of RRC connection request, particularly for (e.g., indicating) a situation where the UE currently RRC connected with another eNodeB—here, eNodeB 12.

For instance, the UE could include within its RRC connection request to eNodeB 14 a value indicating that this is a special handover-version of an RRC connection request, and including an identification (e.g., ECGI) of eNodeB 12. In addition or in combination, the UE could include within its RRC connection request its assigned TMSI or other such UE identifier that would be recognizable by the MME to facilitate additional operations per the disclosure.

In response to eNodeB 14 receiving this special RRC connection request from the UE, eNodeB 14 may then grant the RRC request so as to establish a new RRC connection between the eNodeB 14 and the UE. Further, the eNodeB 14 could respond to the UE's indication that this is a handover-version of RRC connection. Namely, in response that indication, the eNodeB 14 could then signal to the MME 20 to effectively request handover of the UE from eNodeB 12 (as compared with eNodeB 12 requesting handover of the UE to eNodeB 14).

The signaling that eNodeB 14 sends to MME 20 to request handover of the UE could be a newly defined signaling message for this purpose. The message could carry identifiers of the UE (e.g., the UE's TMSI), the target eNodeB 14 (e.g., ECGI of eNodeB 14/cell 16), and the source eNodeB 12 (e.g., ECGI of eNodeB 12/cell 18), among possibly other information, optimally sufficient to enable the MME 20 to determine which UE is at issue, which source eNodeB is at issue, and which target eNodeB is at issue.

In response to this signaling, the MME 20 could then provide the target eNodeB 14 with UE context information that the MME had stored for the UE, such as indications of the two bearers established for the UE. Further, the MME could engage in signaling with the target eNodeB 14 and with the source SGW to arrange for transfer of the UE's bearers from being via eNodeB 12 to being via eNodeB 14.

Through this process, the UE remains RRC connected with the source eNodeB 12. Thus, the source eNodeB may continue to receive downlink data for the UE, buffer the data, and transmit it to the UE in cell 16. Once the MME has transferred the UE's bearers from being via eNodeB 12 to being via eNodeB 14, the MME could then page the UE via eNodeB 12, possibly with a special message, to inform the UE that the handover is just about complete. And the UE could then responsively leave service of eNodeB 12 and proceed to be served by eNodeB 14. The UE could then respond by transmitting to eNodeB 14 an RRC connection reconfiguration complete message, thereby completing the RRC connection process with eNodeB 14. And the UE could proceed to be served by eNodeB 14. Further, the MME or UE could responsively signal to eNodeB 12 to cause eNodeB 12 to release the RRC connection that it had with the UE.

Alternatively or additionally, perhaps if this occurs during a scheduled tune-away period, there may be no data waiting at eNodeB 12 for transmission to the UE, so there may be no need to tunnel such data to eNodeB 14 for transmission to the UE. However, to account for the possibility that such data exists, the SGW 22 could possibly re-transmit to eNodeB 14 a certain extent of data for the UE that the SGW had already transmitted to eNodeB 12, allowing for a duplication of data transmission to the UE, but helping to ensure that the UE receives the transmitted data.

Figure 2:
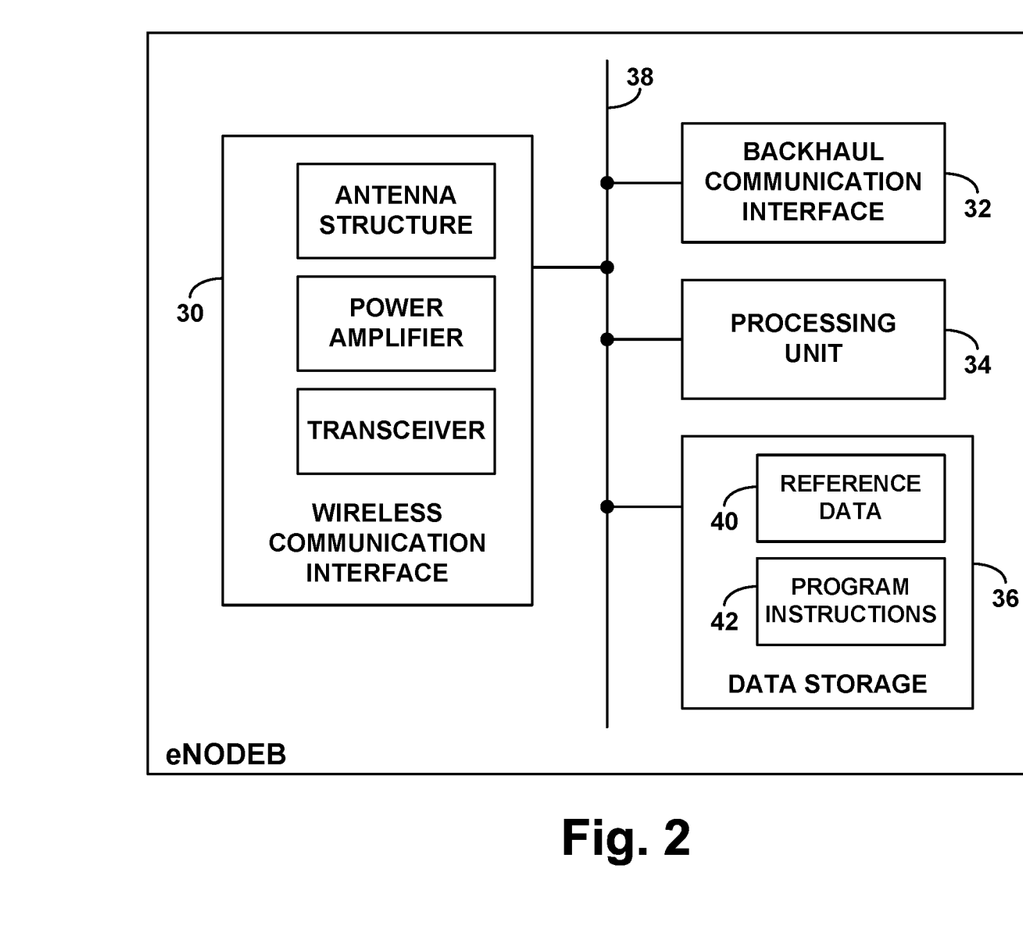
FIG. 2 is simplified block diagram of an example base station operable in the arrangement of FIG. 1.

FIG. 2 is next a simplified block diagram of an example eNodeB (i.e., base station), such as one of the eNodeBs described above. This eNodeB could take various forms, such as a macro eNodeB of the type that typically includes an antenna tower and provides a broad range of coverage, or a small cell (e.g., femtocell) or relay eNodeB, which typically has a much smaller form factor and provides a smaller range of coverage. As shown the example eNodeB includes a wireless communication interface 30, a backhaul communication interface 32, a processing unit 34, and non-transitory data storage 36, all of which could be integrated together in various ways and/or interconnected by a system bus, network, or other communication mechanism 38 as shown.

The wireless communication interface 30 includes a transceiver configured to serve UEs in accordance with one or more agreed air interface protocols, along with a power amplifier and antenna structure through which to engage in air interface communication with served UEs. The backhaul wireless communication interface 32 may then comprise a wired or wireless network communication module, such as an Ethernet interface, through which to communicate with other core network entities, such as with an MME and a gateway system (e.g., SGW interfaced with PGW) that provides connectivity with a packet-switched transport network.

The processing unit 34 may then comprise one or more general purpose processors (e.g., microprocessors) and/or one or more special purpose processors (e.g., application specific integrated circuits). And the non-transitory data storage 36 may comprise one or more volatile and/or non-volatile storage components, such as magnetic, optical, and/or flash storage. As shown, the data storage could then hold various reference data 40 and program instructions 42. The reference data 40 could include data such as a neighbor list as discussed above. And the program instructions 42 could be executable by the processing unit 36 to carry out various base station operations described herein.

Figure 3:
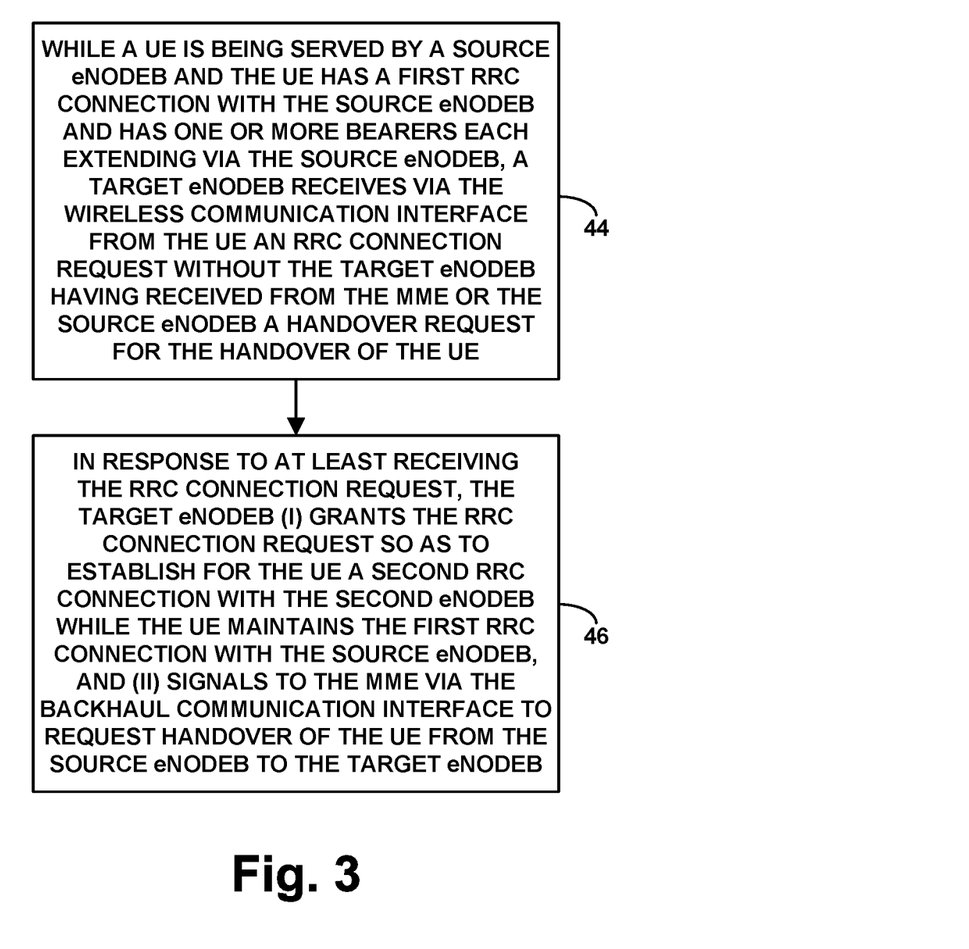
FIG. 3 is a flow chart depicting operations that can be carried out in an example implementation.

In an example implementation, for instance, the eNodeB of FIG. 2 could function as a target eNodeB such as eNodeB 14 shown in FIG. 1 and could carry out operations to facilitate handover of a UE from being served by a source eNodeB such as eNodeB 12 shown in FIG. 1. FIG. 3 is a flow chart depicting these operations by way of example.

As shown in FIG. 3, at block 44, while the UE is being served by the source eNodeB and the UE has a first RRC connection with the source eNodeB and has one or more bearers each extending via the source eNodeB, the target eNodeB receives via the wireless communication interface 30 from the UE an RRC connection request without the target eNodeB having received from the MME or the source eNodeB a handover request for the handover of the UE.

At block 46, in response to at least receiving the RRC connection request (and perhaps further in response to one or more other factors, such as specific data within the RRC connection request and such as one or more admission control factors), the target eNodeB (i) grants the RRC connection request so as to establish for the UE a second RRC connection with the second eNodeB while the UE maintains the first RRC connection with the source eNodeB, and (ii) signals to the MME via the backhaul communication interface 32 to request handover of the UE from the source eNodeB to the target eNodeB.

As discussed above, this signaling to the MME could thus cause the MME to process handover of the UE from being served by the source eNodeB to being served by the target eNodeB. For instance, the MME processing of handover of the UE from being served by the source eNodeB to being served by the target eNodeB could involve the MME engaging in signaling to transfer the UE's one or more bearers from being via the source eNodeB to being via the target eNodeB, and to transfer UE context and other associated information. Further, the processing of handover of the UE from the from being served by the source eNodeB to being served by the target eNodeB could involve signaling to the UE (e.g., paging the UE and/or engaging in other signaling with the UE) to direct the UE to be served by the target eNodeB and to stop being served by the source eNodeB.

In line with the discussion above, the RRC connection request that the UE sends to the target eNodeB in this process can be triggered at least in part by the wireless coverage area of the second eNodeB not being listed on a neighbor list of the source eNodeB. For instance, the RRC connection request could be triggered at least in part by the source eNodeB requesting the UE to provide further information about the wireless coverage area of the target eNodeB after the UE has transmitted to the source eNodeB a measurement report indicating that the UE has detected threshold strong coverage of the target eNodeB.

Moreover, the process could involve the target eNodeB receiving from the UE an indication (e.g., within the RRC connection request from the UE) that the UE is currently served by the source eNodeB, in which case the act of target eNodeB signaling to the MME to request handover of the UE from the source eNodeB to the target eNodeB could be further responsive to the target eNodeB receiving that indication.

Exemplary embodiments have been described above. Those skilled in the art will understand, however, that changes and modifications may be made to these embodiments without departing from the true scope and spirit of the invention.

We claim:

1. A method for handover of a user equipment device (UE) from a first evolved Node B (eNodeB) to a second eNodeB, wherein each eNodeB has a respective communication interface with a mobility management entity (MME) and each eNodeB provides a respective wireless coverage area in which to serve UEs, the method comprising:

while the UE has a first Radio Resource Configuration (RRC) connection with the first eNodeB and has one or more bearers each extending via the first eNodeB, the second eNodeB receiving from the UE an RRC connection request without the second eNodeB having received from the MME or the first eNodeB a handover request for the handover of the UE;

in response to at least the RRC connection request, the second eNodeB (i) granting the RRC connection request so as to establish for the UE a second RRC connection with the second eNodeB while the UE maintains the first RRC connection with the first eNodeB, and (ii) signaling to the MME to request handover of the UE from the first eNodeB to the second eNodeB, wherein the signaling to the MME causes the MME to process handover of the UE from being served by the first eNodeB to being served by the second eNodeB.

2. The method of claim 1, wherein the RRC connection request to the second eNodeB is triggered at least in part by the wireless coverage area of the second eNodeB not being listed on a neighbor list of the first eNodeB.

3. The method of claim 2, wherein the RRC connection request to the second eNodeB is triggered at least in part by the first eNodeB requesting the UE to provide further information about the wireless coverage area of the second eNodeB after the UE has transmitted to the first eNodeB a measurement report indicating that the UE has detected threshold strong coverage of the second eNodeB.

4. The method of claim 2, further comprising the second eNodeB receiving from the UE an indication that the UE is currently served by the first eNodeB, wherein the second eNodeB signaling to the MME to request handover of the UE from the first eNodeB to the second eNodeB is further responsive to the second eNodeB receiving the indication.

5. The method of claim 4, wherein receiving the indication comprises receiving the indication within the RRC connection request from the UE.

6. The method of claim 1, wherein the processing of handover of the UE from being served by the first eNodeB to being served by the second eNodeB comprises the MME engaging in signaling to transfer the UE's one or more bearers from being via the first eNodeB to being via the second eNodeB.

7. The method of claim 1, wherein the processing of handover of the UE from being served by the first eNodeB to being served by the second eNodeB comprises signaling to the UE to direct the UE to be served by the second eNodeB and to stop being served by the first eNodeB.

8. In a wireless communication system including first and second evolved Node-Bs (eNodeBs), wherein each eNodeB has a respective signaling interface with a mobility management entity (MME) and each eNodeB provides a respective wireless coverage area, the second eNodeB comprising:
   a wireless communication interface, including an antenna structure, through which to engage in air interface communication with user equipment devices (UEs);
   a backhaul communication interface through which to communicate with the MME and with a gateway system that provides connectivity with a packet-switched transport network;
   a processing unit;
   non-transitory data storage;
   program instructions stored in the non-transitory data storage and executable by the processing unit to carry out operations to facilitate handover of UE from being served by the first eNodeB to being served by the second eNodeB, the operations including:
      while the UE is being served by the first eNodeB and the UE has a first Radio Resource Configuration (RRC) connection with the first eNodeB and has one or more bearers each extending via the first eNodeB, receiving via the wireless communication interface from the UE an RRC connection request without the second eNodeB having received from the MME or the first eNodeB a handover request for the handover of the UE, and
      in response to at least the RRC connection request, (i) granting the RRC connection request so as to establish for the UE a second RRC connection with the second eNodeB while the UE maintains the first RRC connection with the first eNodeB, and (ii) signaling to the MME via the backhaul communication interface to request handover of the UE from the first eNodeB to the second eNodeB, wherein the signaling to the MME causes the MME to process handover of the UE from being served by the first eNodeB to being served by the second eNodeB.

9. The second eNodeB of claim 8, wherein the RRC connection request to the second eNodeB is triggered at least in part by the wireless coverage area of the second eNodeB not being listed on a neighbor list of the first eNodeB.

10. The second eNodeB of claim 9, wherein the RRC connection request to the second eNodeB is triggered at least in part by the first eNodeB requesting the UE to provide further information about the wireless coverage area of the second eNodeB after the UE has transmitted to the first eNodeB a measurement report indicating that the UE has detected threshold strong coverage of the second eNodeB.

11. The second eNodeB of claim 9, wherein the operations additionally include receiving from the UE an indication that the UE is currently served by the first eNodeB, wherein the signaling to the MME to request handover of the UE from the first eNodeB to the second eNodeB is further responsive to receiving the indication.

12. The second eNodeB of claim 11, wherein receiving the indication comprises receiving the indication within the RRC connection request from the UE.

13. The second eNodeB of claim 8, wherein the processing of handover of the UE from being served by the first eNodeB to being served by the second eNodeB comprises the MME engaging in signaling to transfer the UE's one or more bearers from being via the first eNodeB to being via the second eNodeB.

14. The second eNodeB of claim 8, wherein the processing of handover of the UE from being served by the first eNodeB to being served by the second eNodeB comprises signaling to the UE to direct the UE to be served by the second eNodeB and to stop being served by the first eNodeB.

15. A method of processing handover of a user equipment device (UE) from being served by a first evolved Node-B (eNodeB) to being served by a second eNodeB, wherein each eNodeB has a respective signaling interface with a mobility management entity (MME) and each eNodeB provides a respective wireless coverage area, the method comprising:
   while the UE is served by the first eNodeB and the UE has a first Radio Resource Configuration (RRC) connection with the first eNodeB and has one or more bearers via the first eNodeB, the UE transmitting to the second eNodeB an RRC connection request without the second eNodeB having received a handover request for the handover of the UE from being served by the first eNodeB to being served by the second eNodeB,
   wherein the UE provides to the second eNodeB, within or separately from the RRC connection request, an indication that the UE is currently served by the first eNodeB, wherein the indication causes the second eNodeB to initiate signaling with the MME to request handover of the UE from being served by the first eNodeB to being served by the second eNodeB.

16. The method of claim 15, wherein the signaling with the MME to request handover of the UE from being served by the first eNodeB to being served by the second eNodeB causes the MME to process a transfer of one or more bearers for the UE from being via the first eNodeB to being via the second eNodeB.

17. The method of claim 15, further comprising, while the UE is served by the first eNodeB and has the first RRC connection with the first eNodeB:
   providing by the UE to the first eNodeB a measurement report reporting that the UE has detected threshold strong coverage of the second eNodeB, the measurement report carrying a cell identifier of coverage of the second eNodeB;
   receiving by the UE from the first eNodeB, in response to the measurement report, a directive for the UE to provide further information about the detected coverage, wherein, in response to the directive for the UE to provide further information about the detected coverage, the UE transmits the RRC connection request to the second eNodeB to connect directly with the second eNodeB rather than providing the requested further information about the detected coverage.

18. The method of claim 15, further comprising:

the UE receiving a signaling message directing the UE to transition from being served by the first eNodeB to being served by the second eNodeB; and responsive to the signaling message, the UE transitioning from being served by the first eNodeB to being served by the second eNodeB.

\* \* \* \* \*